United States Patent
Stich

(10) Patent No.: US 10,054,424 B2
(45) Date of Patent: Aug. 21, 2018

(54) TERAHERTZ MEASURING DEVICE AND METHOD FOR MEASURING TEST OBJECTS

(71) Applicant: INOEX GmbH, Melle (DE)

(72) Inventor: Dominik Stich, Gerbrunn (DE)

(73) Assignee: INOEX GmbH, Melle (DE)

( * ) Notice: Subject to any disclaimer, the term of this patent is extended or adjusted under 35 U.S.C. 154(b) by 0 days.

(21) Appl. No.: 15/160,921

(22) Filed: May 20, 2016

(65) Prior Publication Data
US 2017/0023354 A1    Jan. 26, 2017

Related U.S. Application Data

(63) Continuation of application No. PCT/DE2014/100405, filed on Nov. 17, 2014.

(30) Foreign Application Priority Data

Nov. 22, 2013 (DE) ........................ 10 2013 223 945

(51) Int. Cl.
*G01J 5/02* (2006.01)
*G01B 11/06* (2006.01)
(Continued)

(52) U.S. Cl.
CPC ...... *G01B 11/0633* (2013.01); *B29C 47/0023* (2013.01); *B29C 47/92* (2013.01);
(Continued)

(58) Field of Classification Search
CPC ...... G01B 11/06; G01B 11/0633; B29C 47/92
(Continued)

(56) References Cited

U.S. PATENT DOCUMENTS 5,509,733 A    4/1996  Danley
6,982,794 B1   1/2006  Davis et al.
(Continued)

FOREIGN PATENT DOCUMENTS

DE            2 70 144 A1    7/1989
DE   10 2008 046 988 A1    4/2010
JP          2006 234 681 A    9/2006

OTHER PUBLICATIONS

German (DE) Office Action, dated Aug. 7, 2014, in German Priority Application No. DE 2013 223945, filed Nov. 22, 2013 (6 pages).

*Primary Examiner* — David Porta
*Assistant Examiner* — Meenakshi Sahu
(74) *Attorney, Agent, or Firm* — Shlesinger, Arkwright & Garvey LLP

(57) ABSTRACT

Measuring device for measuring test objects includes a transmitter-receiver unit and a corresponding mirror arrangement. Mirror arrangement has a first mirror forming a first focal point and a second focal point in an x-y plane, and first mirror is, at least sectionally, elliptically curved for deflecting radiation between the focal points. Mirror arrangement includes a second mirror arranged in region of first focal point, second mirror is used for deflecting radiation between a z-direction extending transversely to the x-y plane and between the x-y plane. Test object to be measured is arranged in region of second focal point by a test object holder. Radiation reflected on test object is evaluated by a control unit. Measuring device allows measuring of test object in simple and flexible way, in particular measurement over the entire circumference of test objects in form of plastic pipes having circular cross sections.

18 Claims, 8 Drawing Sheets

(51) Int. Cl.
*B29C 47/00* (2006.01)
*B29C 47/92* (2006.01)
*B29L 23/00* (2006.01)

(52) U.S. Cl.
CPC .... G01B 11/06 (2013.01); *B29C 2947/92152* (2013.01); *B29C 2947/92609* (2013.01); *B29C 2947/92942* (2013.01); *B29L 2023/22* (2013.01)

(58) Field of Classification Search
USPC ...................................................... 250/339.1
See application file for complete search history.

(56) References Cited

U.S. PATENT DOCUMENTS

| | | | |
|---|---|---|---|
| 7,768,660 B1 | 8/2010 | Pribil et al. | |
| 9,360,296 B2 * | 6/2016 | White | H04J 14/02 |
| 9,791,263 B2 | 10/2017 | Hochrein | |
| 2009/0059205 A1 * | 3/2009 | Itsuji | G01N 21/3581 356/51 |

* cited by examiner (1) TERAHERTZ MEASURING DEVICE AND METHOD FOR MEASURING TEST OBJECTS

CROSS-REFERENCE TO RELATED APPLICATIONS

This application is a continuation of application number PCT/DE2014/100405, filed Nov. 17, 2014, which claims the priority of German application number DE 10 2013 223945, filed Nov. 22, 2013, and each of which is incorporated herein by reference.

FIELD OF THE INVENTION

The invention relates to a terahertz measuring device and a method for measuring test objects. The test objects to be measured, in particular, comprise, at least partially, a material layer in the shape of a hollow cylinder.

BACKGROUND OF THE INVENTION

From the publication DE 10 2008 046 988 A1 a reflectometer for characterizing materials with regard to at least one optical reflection characteristic is known. The reflectometer comprises an ellipsoid mirror within the first focal point of which a sample to be characterized is held by way of a sample holder. By way of the sample holder the sample can be rotated about an axis of rotation. The sample is irradiated through an opening in the ellipsoid mirror by way of a radiation source. The ellipsoid mirror maps the radiation reflected by the sample illuminated in the first focal point via an aperture located in the second focal point onto a detector disposed behind that. Subsequently, the measured data from the reflectometer are assessed for characterizing the sample.

OBJECTS AND SUMMARY OF THE INVENTION

The invention is based on the object of creating a terahertz measuring device for measuring reflections off test objects made, in particular, of plastics, which allows measuring test objects in a simple and flexible way. In particular, the measuring device should allow measuring test objects which comprise, at least partially, at least one material layer in the shape of a hollow cylinder.

This object is achieved by a terahertz measuring device according to the invention having the features according to claim 1. The terahertz measuring device or, respectively, the reflection measuring device serves to carry out reflection measurements of the test object to be measured. Thus, the measuring of the test object happens by way of reflection measuring. The first mirror of the at least one mirror array is at least partially elliptically curved and forms in a plane x-y a first focal point and an associated second focal point. In the area of the first focal point a second mirror is disposed which runs through the first focal point and is disposed in a manner inclined relative to the plane x-y-, i.e. inclosing an angle therewith unequal to 0°. The test object to be measured is disposed by way of the test sample holder inside the area of the second focal point. The at least one transmitter-receiver unit is disposed outside the plane x-y, i.e. in a direction z spaced apart from the plane x-y. This is made possible due to the deflection by way of the second mirror. The second mirror encloses with the plane x-y-an angle $\alpha$, whereby for a the following applies: $30°\leq\alpha\leq60°$, in particular, $35°\leq\alpha\leq55°$, and, in particular, $40°\leq\alpha\leq50°$. Preferably, the angle $\alpha=45°$.

For carrying out a measurement of the test object, firstly, the transmitter of the transmitter-receiver unit emits radiation in the direction of the second mirror. The radiation emitted is deflected by way of the second mirror into the plane x-y and subsequently hits the first mirror. Owing to the elliptic curvature of the first mirror the radiation is reflected into the direction of the second focal point. Since the test object is disposed in the region of the second focal point the radiation hits the test object and is reflected in turn from there. Preferably, the test object is disposed in such a way that a center longitudinal axis of the test object runs through the second focal point so that the radiation or, respectively, the beam hits the test object in a radial manner and the incident angle of the radiation corresponds to the angle of reflection. The radiation reflected on the test object follows the same path of rays, albeit in the opposite direction, as the incident radiation. The reflected radiation is reflected by the first mirror owing to its elliptic curvature into the direction of the first focal point where it hits the second mirror. The second mirror deflects the reflected radiation transversely, in particular at right angles, to the plane x-y in the direction of the transmitter-receiver unit. The receiver detects the reflected radiation and forwards the measured values to the control unit which evaluates the detected radiation or the measured values respectively.

The terahertz measuring device according to the invention is constructed in a comparatively simple manner because the at least one transmitter-receiver unit, owing to the associated mirror array, can be disposed outside, i.e. in the direction z spaced apart from the plane x-y. Due to the disposition of the test object in the area of the second focal point by way of the test object holder and the second mirror in the area of the first focal point, the test object can be measured in a flexible manner. For example, by pivoting or rotating the second mirror about the first focal point and/or by pivoting or rotating the test object about the second focal point, a wide circumferential area of the test object can be measured using only one transmitter-receiver unit. For example, it is possible to measure a thickness of at least one layer of material in the shape of a hollow cylinder across the entire circumference. The test object has, in particular, the shape of a hollow cylinder, i.e. a pipe with a circular cross section. The test object is made, in particular, of plastic. The test object comprises, in particular, a layer of material in the shape of a hollow cylinder or several layers of material in the shape of hollow cylinders.

Preferably, the at least one transmitter-receiver unit is designed in such a way that electromagnetic radiation at a frequency in the range of between 0.01 THz and 50 THz, in particular, from 0.05 THz to 20 THz, and in particular from 0.1 THz to 10 THz can be emitted or detected respectively. This enables the measuring of, in particular, test objects made of plastic. The measuring of test object by means of the radiation or, respectively, THz radiation is based on measuring a delay time of the radiation reflected on the boundary layers. Boundary layers are the surfaces of the test object, e.g. the outside wall of the pipe and the inside wall of the pipe, and adjoining layers of materials within the test object. The at least one transmitter-receiver unit is configured, in particular, in such a way that THz pulses can be emitted or detected respectively.

A terahertz measuring device according to claim 2 guarantees a measuring of the test object in a simple manner. Owing to the fact that the at least one transmitter-receiver unit is disposed along the axis z, i.e. perpendicular spaced apart from the plane x-y, the space or interior space respectively defined by the first mirror is not unnecessarily impaired by the transmitter-receiver unit, whereby the radiation is deflected in a simple manner. The second mirror requires comparatively little space so that the mirror array is configured in a comparatively compact manner. The size of mirror array is determined merely by the size of the test object to be measured. The z axis runs perpendicular to the plane x-y. Correspondingly, the second mirror is inclined to deflect the radiation by 45° in relation to the plane x-y.

A terahertz measuring device according to claim 3 guarantees a complete measuring of the test object. At a side of the test object facing away from the second mirror an area of the test object is shadowed due to the space covered by the test object itself so that this area cannot be measured using the first mirror array. The shaded area is measures using the second mirror array which is disposed offset in the direction z in relation to the first mirror array. Where exactly two mirror arrays are arranged in a suitable manner the test object can be measured completely; however, more than two mirror arrays may be provided if this is advantageous. The mirror arrays are disposed in relation to each other such that the shaded area, which cannot be measured by the first mirror array, can be measured using the second mirror array and vice versa. Preferably, the at least two mirror arrays are configured identically. It is advantageous to provided more mirror arrays, in particular, when it is not possible to pivot or rotate the test object about the respective second focal point, for example, when the measuring procedure happens in-line during the manufacturing process.

A terahertz measuring device according to claim 4 guarantees a complete measuring of the test object. A central longitudinal axis of the test object is congruent with the straight line through the second focal points so that the radiation in the at least two mirror arrays hits the test object or a surface of the test object respectively always radially.

A terahertz measuring device according to claim 5 guarantees a complete measuring of the test object by means of the exactly two mirror arrays. The alignment of the exactly two mirror arrays guarantees that by means of the one mirror array the shaded region of the test object can be measured which cannot be measured by the respective other mirror array. The plane y-z runs perpendicular to the plane x-y through the respective second focal points. Preferably, the first focal points lie in a plane x-z which runs through the second focal points.

A terahertz measuring device according to claim 6 guarantees a simple and quick measuring of the test object. Owing to the fact that to each mirror array its own transmitter-receiver unit is associated, the test object can be measured simultaneously by way of the at least two mirror arrays. In particular, the measuring device comprises exactly two mirror arrays and exactly two associated transmitter-receiver units.

A terahertz measuring device according to claim 7 guarantees a nearly complete measuring of the test object. This applies, in particular, if the test object itself cannot be pivoted or rotated respectively around the second focal point, for example, if the measuring is carried out in-line in the manufacturing process. Due to the pivoting of the second mirror about the axis z the radiation emitted hits the first mirror in differing angles so that the first mirror—starting from differing reflection spots—reflects the radiation in the direction of the second focal point. Thus, the radiation hits the surface of the test object in differing spots whereby the test object is measured in a wide circumferential range. Hereby, with the exception of the area shaded by the test object itself, a nearly complete measuring of the test object, in particular, a second mirror array is provided whereby the respective second mirror can be pivoted about an associated z axis through the respective first focal point.

A terahertz measuring device according to claim 8 guarantees a complete measuring of the test object in a simple manner. The second mirror may be mounted fixed in relation to the first mirror so that the complete measuring happens solely by pivoting or rotating respectively the test object. Further, the second mirror may be pivotable about an axis z running parallel to the direction z through the first focal point so that the test object holder must be pivotable only so much as to allow the shaded region of the test object which cannot be reached by pivoting the second mirror to be measured.

A terahertz measuring device according to claim 9 guarantees an exact measuring of the test object in a simple manner. The radiation emitted exhibits a beam divergence in the plane x-y. The extent of the measurement range depends on the elliptic geometry of the first mirror whereby the extent of the measurement range as a function of an angle of rotation of the second mirror changes the less the smaller the relationship of the lengths of the semimajor to the semiminor.

A terahertz measuring device according to claim 10 guarantees an exact measuring of the test object in a simple manner. The radiation emitted and deflected by the second mirror exhibits a beam divergence perpendicular to the plane x-y. Owing to the curved design of the first mirror in the direction z the radiation reflected on the first mirror, depending on the curvature of the first mirror, is focused or at least collimated. This guarantees that the radiation reflected on the test object runs through the beam path again in the exact opposite direction and can thus be detected.

If the first mirror is curved parabolically in the direction z—and the first focal point, in particular with all angles of rotation of the second mirror, coincides with the focal point of the parable or the parabolic curvature respectively, then the radiation reflected on the first mirror is collimated in the direction z. All partial beams of the beam or the radiation respectively, independent of the radius of the test object, always hit the test object perpendicularly. The extension of the measuring range in the direction z is the diameter of the collimated beam created by the divergence angle and the distance between the second and the first mirror along the beam path traveled.

If the first mirror is curved elliptically in the direction z, whereby the first focal point of the first mirror in the plane x-y, in particular with all angles of rotation of the second mirror, coincides with the first focal point of ellipse or elliptical curvature respectively formed in the direction z, then the radiation reflected is focused on a second focal point which lies on the surface of the test object. Thus, extension of the measuring range in the direction z is optimized due to the focusing.

If the first mirror is curved spherically in the direction z so that the first mirror is an ellipsoid of rotation created upon rotation about an axis y, then the radiation is focused in the plane x-y and along the direction z on the second focal point. This leads to a focusing of the beam or the radiation respectively in the direction z whereby the focusing is the stronger the smaller the radius of the test object. A spherical curvature is advantageous, in particular, when the radius of the test object is significantly smaller than the semiaxes.

Furthermore, the first mirror may be curved as a free-form surface in the direction z and optimized in such a way that for a predefined area of the radius of the test object a measuring area or measuring point respectively with a desired focusing dimension is attained.

A terahertz measuring device according to claim 11 guarantees an exact measuring of the test object in a simple manner. The radiation or the beam respectively is focused onto the test object in that the first mirror is designed planar in the direction z and a focusing element is inserted which influences the beam diffusion perpendicular to the plane x-y and focuses the radiation or the beam respectively in the direction z. For example, the second mirror may be designed curved so that this acts as an additional focusing element and focuses the radiation in the direction z. Further, the focusing element may be designed as a lens located in the beam path between the transmitter-receiver unit and the associated second mirror and influencing the beam diffusion in the direction z, i.e. focusing the radiation in the direction z. In particular, the focusing element is rotatable together with the second mirror about the z axis.

For example, the incident collimated radiation is focused by way of a focusing element designed as a cylindrical lens onto the second mirror located in the first focal point. The focusing element and the second mirror preferably rotate in common and are disposed in relation to each other in such a way that the diverging plane of the radiation or the beam respectively is located behind the second mirror in the plane x-y. A second focusing element designed as a cylindrical lens is disposed perpendicular to the first lens and is positioned, likewise, in the beam path prior to the second mirror and can, correspondingly to the first lens, be rotated together with the second mirror. By way of the second lens the radiation is focused before the second mirror in the direction y and after the second mirror in the direction z.

The distance between the second lens and the surface of the test object corresponds to the focal length thereof. By changing the lens position of the second lens along the z axis the measuring focus may be adapted in the direction z to test objects of differing radii.

The invention is further based on the object of creating a method enabling simple and flexible measuring of test objects. In particular, the method should allow the measuring of test objects which comprise, at least partially, a material layer in the shape of a hollow cylinder.

This task is solved by a method having the features of claim 12. The advantages of the method according to the invention correspond to the above described advantages of the measuring device according to the invention. The method according to the invention may be further developed, in particular, using the features of the claims 2 through 11. Correspondingly, the measuring device according to the claims 1 through 11 may be further developed by the features of the claims 12 through 15.

A method according to claim 13 guarantees a complete measuring of the test object. The test object can be pivoted about an axis of rotation running through the second focal point and/or the second mirror can be pivoted about the axis z running through the first focal point. This enables the test object to be measured in a wide circumferential range whereby, in particular, a shaded region can also be measured when a corresponding pivotability or rotatability respectively is provided. For a measuring of the test object in-line in a manufacturing process, in particular, the second mirror is pivotable or rotatable respectively about the axis z. In the manufacturing process the test object itself usually cannot be pivoted or rotated about its central longitudinal axis.

A method according to claim 14 guarantees a flexible measuring of test objects in the shape of hollow cylinders. If the test object is designed, for example, in the shape of a hollow cylinder as a pipe, then the measuring of the wall thickness is possible along the circumference and the length of the pipe. If the pipe or test object respectively additionally comprises further layers of materials then it is also possible to measure the layer thicknesses of the material layers along the circumference and the length. The same applies to test objects designed as hollow cylinders in the widest sense which have a central longitudinal axis and/or comprise material layers in the shape of hollow cylinders with circular cross sections in the widest sense. Preferably, the test object is designed as a pipe with a circular cross sections made from one single material or several layers of materials having the shapes of hollow cylinders. In particular, the test object is made of plastics. For measuring test object made of plastics, in particular, THz radiation is suited. of test objects of circular cross section are arranged in such a way that a center longitudinal axis of the test objects runs through the second focal point. In such an arrangement of the test objects the radiation hits the surface of the test objects perpendicularly thereby attaining a high measuring accuracy. Where the test object is designed, for example, as a full cylinder it is possible to measure the wall thickness of a material layer in the shape of a hollow cylinder.

A method according to claim 15 guarantees a simple measuring of test objects made of plastics.

Relative terms such as left, right, up, and down are for convenience only and are not intended to be limiting.

Further features, advantages and specifications of the invention can be seen from the following description of various embodiment examples. The drawing shows in:

DETAILED DESCRIPTION OF TEE INVENTION

Figure 1:
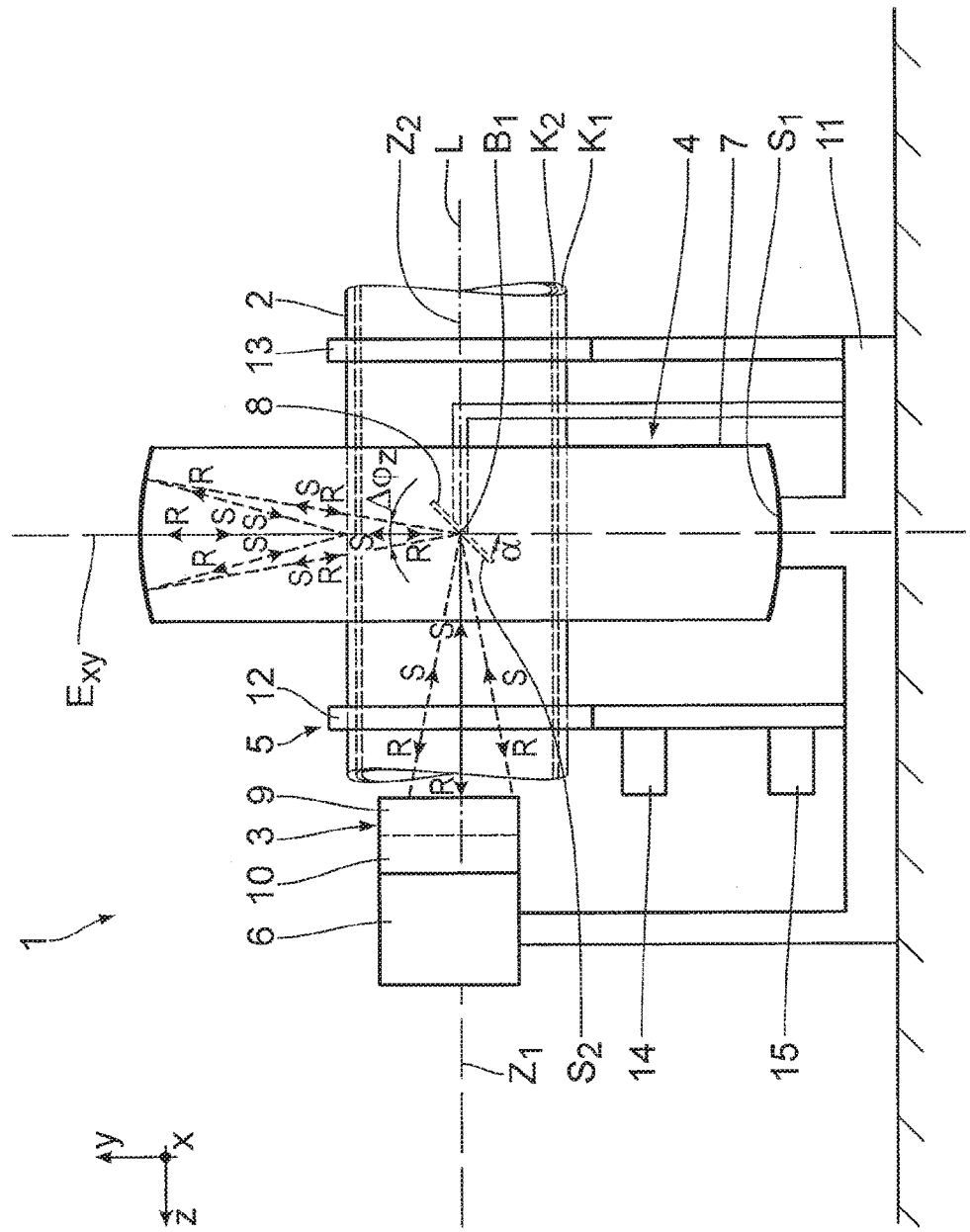
FIG. 1 a side view of a terahertz measuring device for measuring a test object according to a first embodiment example, FIG. 2 a top view of the terahertz measuring device of FIG. 1, FIG. 3 a side view of a terahertz measuring device for measuring a test object according to a second embodiment example, FIG. 4 a top view of the terahertz measuring device of FIG. 3, FIG. 5 a side view of a terahertz measuring device for measuring a test object according to a third embodiment example, FIG. 6 a first side view of a terahertz measuring device for measuring a test object according to a fourth embodiment example, FIG. 7 a second side view, rotated by 90°, of the terahertz measuring device of FIG. 6, FIG. 8 a top view of a terahertz measuring device for measuring a test object with two mirror arrays and two associated transmitter-receiver units according to a fifth embodiment example, and FIG. 9 a chronological sequence of a radiation emitted as a THz pulse.

A first embodiment example of the invention is described below be means of the FIGS. 1 and 2. For measuring a test object 2 a measuring device 1 comprises a transmitter-receiver unit 3, an associated mirror array 4, a test object holder 5 and a control unit 6.

The mirror array 4 includes a first mirror 7 which is configured and disposed symmetrically in relation to a plane x-y $E_{xy}$. Said plane x-y $E_{xy}$ is defined by a direction x and a direction y extending perpendicular thereto. The first mirror 7 is curved elliptically in the plane x-y $E_{xy}$ and in parallel thereto. Thus the first mirror 7 forms, in the plane x-y $E_{xy}$, a mirror surface $S_1$ in the shape of an ellipse. Owing to the elliptical curvature the first mirror 7 has two focal points $B_1$ and $B_2$ in the plane x-y $E_{xy}$. Said focal points $B_1$ and $B_2$ each have a distance e from the center point M of the ellipse in the direction x.

The ellipse or the elliptical shape respectively of the first mirror 7 is defined by a first semiaxis A with an associated length a and a second semiaxis B with a length b shorter than that of the first semiaxis A. For the relationship of the lengths a/b the following applies: $a/b \leq 1.3$, in particular $a/b \leq 1.2$, and in particular $a/b \leq 1.1$.

The mirror array 4 further includes further a second mirror 8 located in the area of the first focal point $B_1$. The second mirror 8 is configured planar, i.e. it has a planar mirror surface $S_2$. The second mirror 8 encloses with the plane x-y $E_{xy}$ an angle α, whereby the following applies to α—depending on the disposition of the transmitter-receiver unit 3: $30° \leq \alpha \leq 60°$, in particular $35° \leq \alpha \leq 55°$, and in particular $40° \leq \alpha \leq 50°$. Preferably, the angle α=45°. Preferably, the second mirror 8 is disposed in such a way the first focal point $B_1$ lies essentially centrally on the mirror surface $S_2$.

The transmitter-receiver unit 3 comprises a transmitter 9 for emitting radiation S. Hereafter, the radiation emitted, from the transmitter 9 up to the test object 2, is referred to as S. Hereafter, the radiation reflected from the test object 2, from the test object 2 up to a receiver 10, is referred to as R. The receiver 10 serves to detect the radiation R reflected on the test object 2. For measuring the test object 2 the detected radiation R is evaluated by way of the control unit 6.

Owing to the elliptical curvature of the first mirror 7 the radiation S, R is deflected between the focal points $B_1$ and $B_2$. In contrast thereto, the second mirror 8 serves to deflect the radiation S, R between a direction z, running transversely or perpendicularly respectively to the plane x-y $E_{xy}$, and the plane x-y $E_{xy}$. The direction z-direction extends perpendicularly to the direction x and the direction y so that the directions x, y and z form a Cartesian coordinate system.

The transmitter-receiver unit 3 is disposed in the direction z spaced apart from the plane x-y $E_{xy}$. The transmitter-receiver unit 3 is disposed along a first axis z $Z_1$ running parallel to the direction z through the first focal point $B_1$.

The transmitter-receiver unit 3, the mirror array 4, the test object holder 5 and the control unit 6 are affixed to a base frame 11 of the measuring device 1. The test object holder 5 is configured such that the test object 2 is rotatable about a second axis z $Z_2$. The second axis z $Z_2$ extends parallel to the direction z through the second focal point $B_2$. To that end the test object holder 5 is provided with, for example, two holding receptacles 12, 13 which are disposed at both sides of the plane x-y $E_{xy}$ and concentrically to the second axis z $Z_2$. The holding receptacles 12, 13 can be rotated in relation to the base frame 11 about the second axis z $Z_2$. To that end the test object holder 5 is provided with a first electric drive unit 14 which rotary drives the holding receptacles 12, 13 synchronously. The test object holder 5 can be linearly displaced in the direction z by means of a second electric drive unit 15.

The test object 2 is configured in the shape of a hollow cylinder and exhibits a circular or, respectively, ring-shaped cross-section. The test object 2 is disposed or arranged by use of the test object holder 5 such that a central axis L is congruent with the second axis z $Z_2$. The test object 2 is configured in two layers and comprises two layers of material $K_1$ and $K_2$ in the shapes of hollow cylinders. The test object 2 is made of plastics whereby, in particular, the two material layers $K_1$ and $K_2$ are made from differing plastic materials. For measuring the test object 2 the transmitter-receiver unit 3 is configured in such a way that the electromagnetic radiation S, R can be emitted or detected respectively at a frequency in the range between 0.01 THz and 50 THz, in particular from 0.05 THz to 20 THz, and in particular from 0.1 THz to 10 THz. Preferably, the radiation S is emitted in pulse, i.e. THz pulses are generated.

For focusing the radiation S, R in the direction z the first mirror 7 is curved concavely in the direction z. As illustrated in FIG. 1, the mirror surface $S_1$ of the first mirror 7 exhibits a concave curvature in the direction z.

The measuring device 1 operates as follows:

The transmitter 9 emits radiation S in the form of THz pulses. It is known as such how to generate THz pulses. For example, THz pulses are generated optically by use of femtosecond laser pulses and photoconductive switches. The radiation S is emitted essentially in the direction z and focused onto the first focal point $B_1$.

By use of the second mirror 8 the radiation S is deflected from the direction z into the plane x-y $E_{xy}$ and hits the mirror surface $S_1$ of the first mirror 7. Owing to the elliptical curvature the radiation S coming from the direction of the first focal point $B_1$ is reflected on the mirror surface $S_1$ in the direction of the second focal point $B_2$. Because the text object 2 is located in the beam path between the mirror surface $S_1$ and the second focal point $B_2$, the radiation hits the test object 2 radially and is reflected on the various boundary layers of the test object 2. The individual boundary layers are the outer surface and the inner surface of the test object 2 as well as the boundary layers of the material layers $K_1$ and $K_2$ lying between them. Thus, the THz pulses are irradiated by the transmitter-receiver unit 3 radially onto the test object 2 or the pipe 2 respectively.

The radiation R reflected or, respectively, the THz pulses reflected run back along the same beam path to the transmitter-receiver unit 3 where they are detected by the receiver 10. The construction of the receiver 10 is known as such. THz pulses are detected, for example, by use of optical scanning (sampling) using femtosecond laser pulses.

When measuring the test object 2, in particular, a wall thickness $d_W$ of the test object 2 as well as layer thicknesses $d_1$ and $d_2$ of the material layers $K_1$ and $K_2$ are determined. The measurement of the wall thickness $d_W$ as well as of the layer thicknesses $d_1$ and $d_2$ are based on the measurement of delay times of the THz pulses reflected on the individual boundary layers. The delay times are evaluated and the thicknesses $d_W$, $d_1$ and $d_2$ are determined by the control unit 6.

Figure 2:
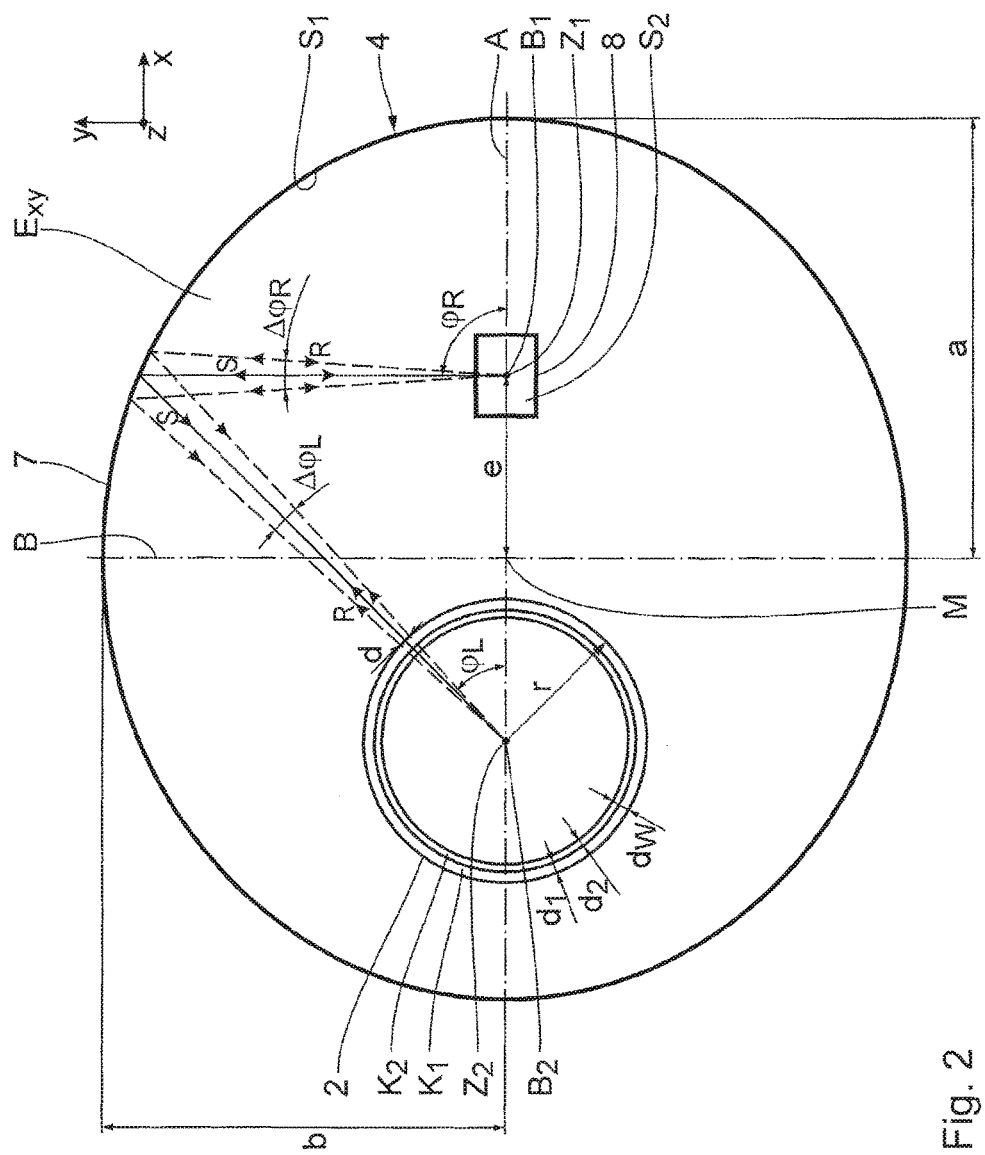

In the FIGS. 1 and 2 an ideal beam is shown in a continuous line. As an ideal beam the radiation S hits the text object 2 in a punctiform manner so that the text object 2 is measured in one measuring point. By rotating the text object 2, using the test object holder 5, about the second z axis $Z_2$ forming an axis of rotation, the test object 2 can be measured completely along a circumferential line. To that end the holder receptacles 12, 13 are rotated about the second axis z $Z_2$ using the drive unit 14. Moreover, by use of the drive unit 15 the test object holder 5 can be linearly displaced along the direction z so that the test object 2 is measured completely also along its length.

Further, in the FIGS. 1 and 2 a real beam proliferation of the radiation S, R is shown in dotted lines. The radiation S emitted is focused by use of the transmitter-receiver unit 3 firstly into the first focal point $B_1$. To that end the transmitter-receiver unit 3 comprises e.g. a lens. The radiation S reflected on the second mirror 8 exhibits a beam divergence.

The radiation S, R has, on the one hand, a divergence angle $\Delta\varphi_R$ in the plane x-y $E_{xy}$ and a divergence angle $\Delta\varphi_z$ in the direction z. Due to the elliptic curvature of the first mirror 7 in the plane x-y $E_{xy}$, the radiation S, R is focused onto the respective focal point $B_1$ and $B_2$. In the case of a real beam proliferation the radiation S hits the test object 2 not in a punctiform manner but in a measuring area whereby the individual beams or beam parts respectively each hit the test object 2 radially. The size of the measuring area depends on the divergence angle $\Delta\varphi_R$ and a radius r of the test object 2.

The second mirror 8 is disposed in such a way that the radiation S ideally is reflected to the first mirror 7 at an angle $\varphi_R$ to the direction x whereby the radiation S, due to the real beam proliferation, exhibits a divergence angle $\Delta\varphi_R$. Due to the fixed arrangement of the second mirror 8 the following applies to the angle $\varphi_R$: $\varphi_R = 90°$. In the case of ideal beam proliferation the radiation S hits the test object 2 at an angle $\varphi_L$, relative to the direction whereby the radiation S exhibits a divergence angle $\Delta\varphi_L$, when hitting the test object 2. The following applies to the divergence angle or, respectively, opening angle $\Delta\varphi_L$:

$$\Delta\varphi_L(\varphi_R, \Delta\varphi_R, a, b) = \arccos\left(\frac{2a^2 - b^2 - \frac{ab^2}{a + \sqrt{a^2 - b^2}\cos(\varphi_R + \Delta\varphi_R/2)}}{\sqrt{a^2 - b^2}\left(2a - \frac{b^2}{a + \sqrt{a^2 - b^2}\cos(\varphi_R + \Delta\varphi_R/2)}\right)}\right) - \arccos\left(\frac{2a^2 - b^2 - \frac{ab^2}{a + \sqrt{a^2 - b^2}\cos(\varphi_R - \Delta\varphi_R/2)}}{\sqrt{a^2 - b^2}\left(2a - \frac{b^2}{a + \sqrt{a^2 - b^2}\cos(\varphi_R - \Delta\varphi_R/2)}\right)}\right) \quad (1)$$

For a size d of the measuring area in the plane x-$E_{xy}$ the following applies by approximation:

$$d(\Delta\varphi_L, r) = \Delta\varphi_L \cdot r \quad (2)$$

Thus, the size d of the measuring area under a specific angle $\varphi_L$ is directly proportional to the radius r of the test object 2. In order to attain a measuring area as small as possible $\Delta\varphi_L$ must be as small as possible. The opening angle $\Delta\varphi_L$ depends on the angle $\varphi_R$. The smaller $\varphi_R$ the smaller the angle $\Delta\varphi_L$.

Moreover, the angle $\Delta\varphi_L$ depends on the lengths a and b of the semiaxes A and B.

Thus, the test object 2 can be completely measured using one single transmitter-receiver unit 3 as well as the associated mirror array 4. Despite the diverging beam dispersion the radiation S or the respective THz pulses hit the boundary layers of the test object 2 radially, i.e. perpendicularly and, moreover, at identical points in time. This guarantees that the reflected radiation R exhibits a high signal quality whereby, in particular, the reflected THz pulses are not washed out and attenuated in their amplitude.

Owing to the fact that the mirror surface $S_1$ is elliptically curved also in the direction z the radiation S, R is focused also in the direction z. The first mirror 7 is elliptically curved in the direction z preferably in such a way that a first focal point coincides with the first focal point $B_1$ and a second focal point lies on the outer surface of the test object 2. This is illustrated in FIG. 1. Thus, the radiation S exhibits an optimized, i.e. as small as possible, measuring area also in the direction z.

Figure 3:
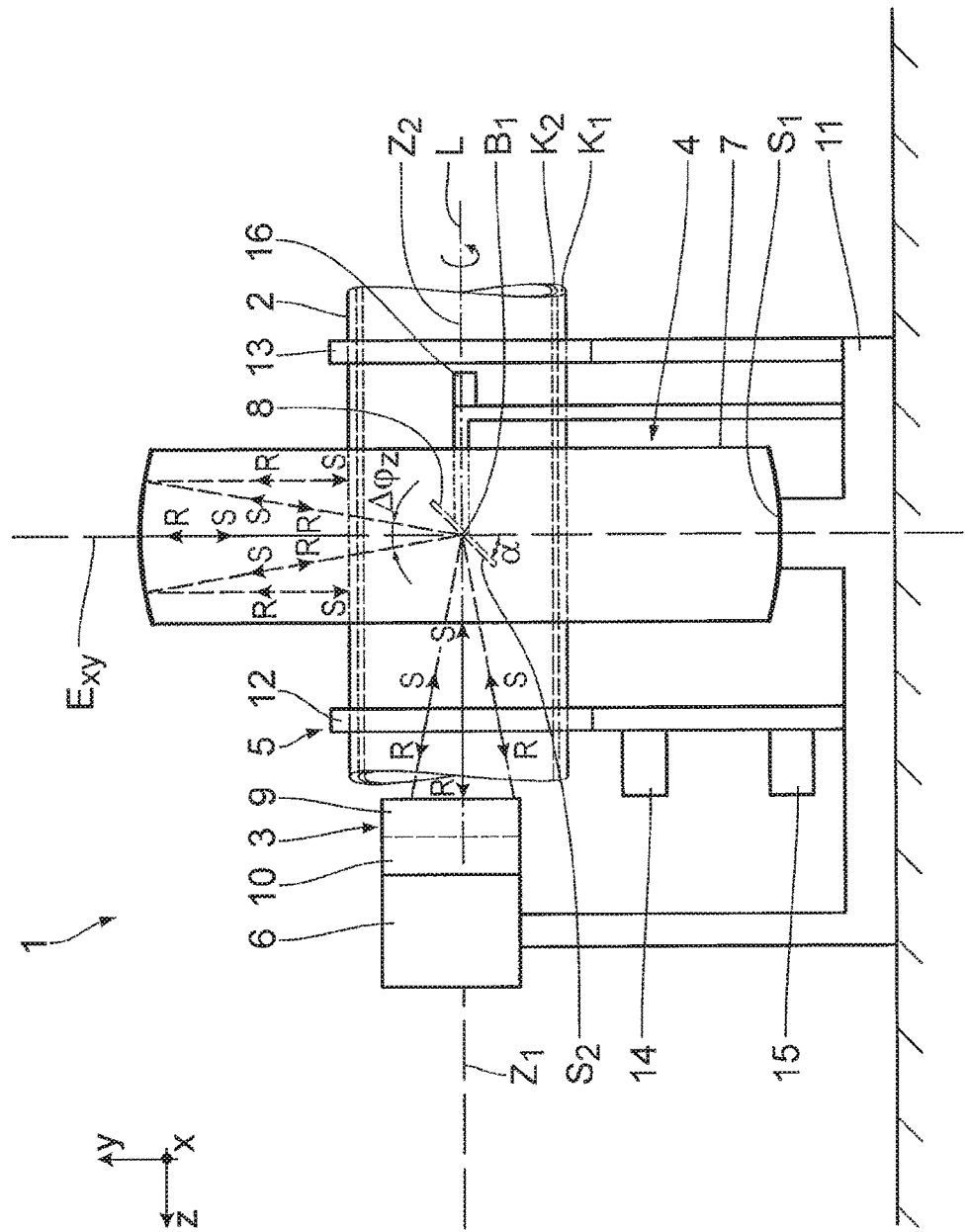
Figure 4:
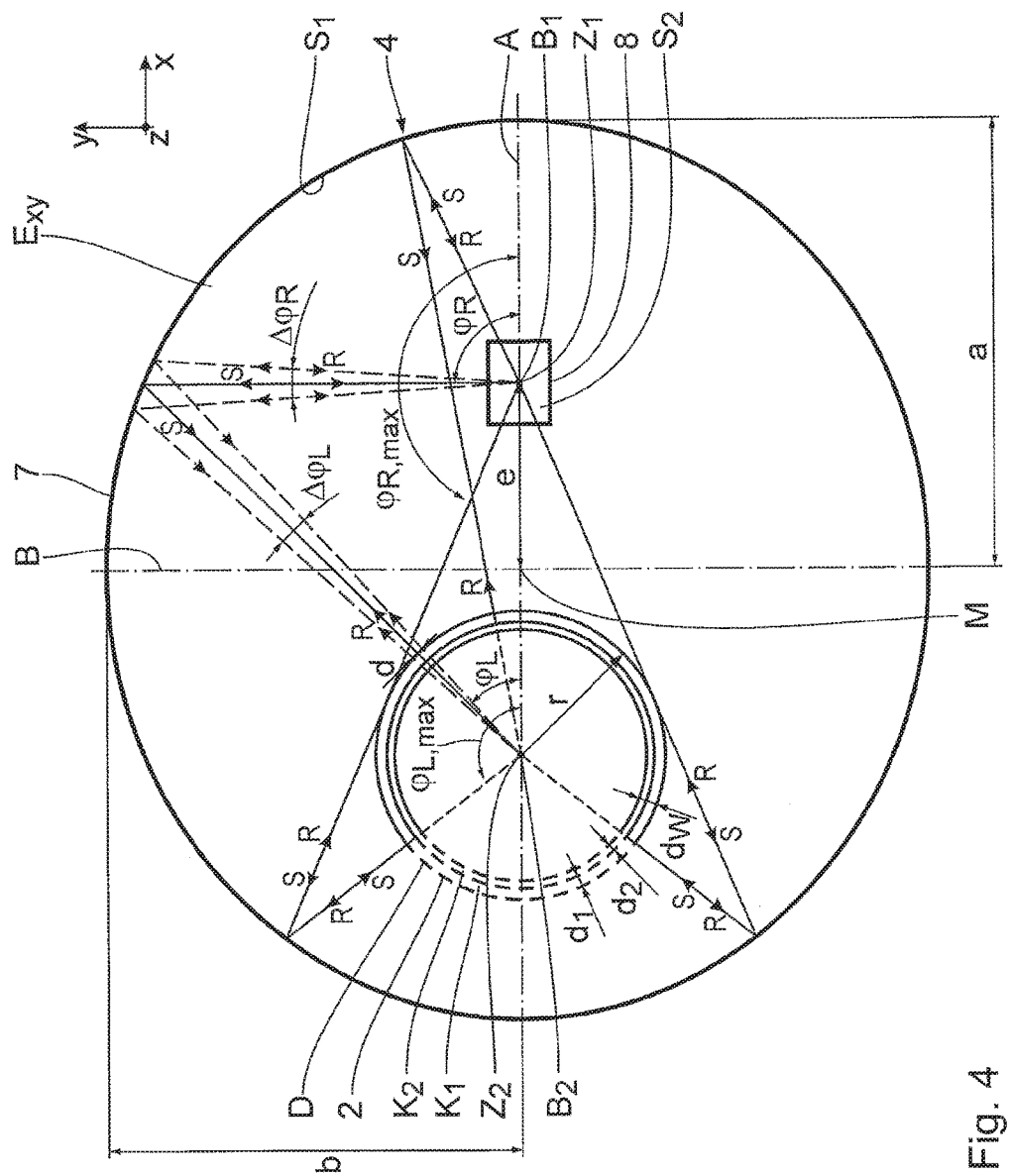

In the following a second embodiment example of the invention is described by way of FIGS. 3 and 4. In contrast to the first embodiment example the second mirror 8 is pivotable about the first z axis $Z_1$, in particular, rotatable by 360°, by use of a third drive unit 16. Thus, the angle $\varphi_R$ is changeable by such rotation. Hereby, the test object 2, even when fixed about the second z axis $Z_2$, can be measured across a wide circumferential area. FIG. 4 shows additional, in relation to FIG. 2, beam paths of the radiation S illustrating a measuring of the test object 2. Independent of the angle $\varphi_R$ the radiation S is deflected by means of the first mirror 7 between the focal points $B_1$ and $B_2$. Upon measuring of the test object 2 the radiation S always hits the test object 2 always radially or perpendicularly, independent of the angle $\varphi_R$.

At an angle $\varphi_{R,max}$ the radiation S running towards the test object 2 is tangent to the test object 2 in such a way that the test object 2 at angles larger than $\varphi_{R,max}$ is shaded on a side facing away from the second mirror 8. The shaded area of the test object 2 is shown as a dotted line in FIG. 4 and designated as D. For the angle $\varphi_{R,max}$ the following is true:

$$\varphi_{R,max} = \pi - \arcsin\left(\frac{r}{2e}\right) \quad (3)$$

At an angle $\varphi_{R,max}$ the radiation S hits the test object 2 at an angle $\varphi_{L,max}$ so that the maximum measurable angular range of the test object 2, if this is fixed about the second z axis $Z_2$, equals $2\varphi_{L,max}$.

The shaded area D is measured in that the test object 2 is pivoted, corresponding to the first embodiment example, about the second z axis $Z_2$. In contrast to the first embodiment example, however, the test object 2 does not have to be rotatable by 360° about the second z axis $Z_2$, rather, it requires pivoting such that the shaded area D in a pivoted position lies within the measurable angular range $2\varphi_{L,max}$.

According to equation (1) the angle of divergence $\Delta\varphi_L$ depends on the angle $\varphi_R$. The alteration of $\Delta\varphi_L$ as a function of the angle $\varphi_R$, however, is the smaller the closer the lengths a of the semimajor A and b of the semiminor B are together. Thus, the measuring accuracy of the measuring device 1 is the less dependent on the angle $\varphi_R$ the closer the relationship a/b is to 1.

A further difference in comparison to the first is that the first mirror 7 is parabolically curved in the direction z, whereby the first focal point $B_1$ coincides with the focal point of the parable at all angles $\varphi_R$. By reflection of the radiation S the radiation S is collimated in the direction z. This is illustrated in FIG. 3. By virtue of the parabolic curvature of the first mirror 7 the radiation S is collimated in the direction z so that all entire beams or, respectively, partial beams independently of the radius r of the test object 2 always hit the test object 2 perpendicularly. The spread of the measuring area in the direction z is the diameter of the collimated radiation S which is defined by or may be adjusted respectively by the angle of divergence $\Delta\varphi_z$.

As regards the construction otherwise and the operation otherwise reference is made to the first embodiment example.

Figure 5:
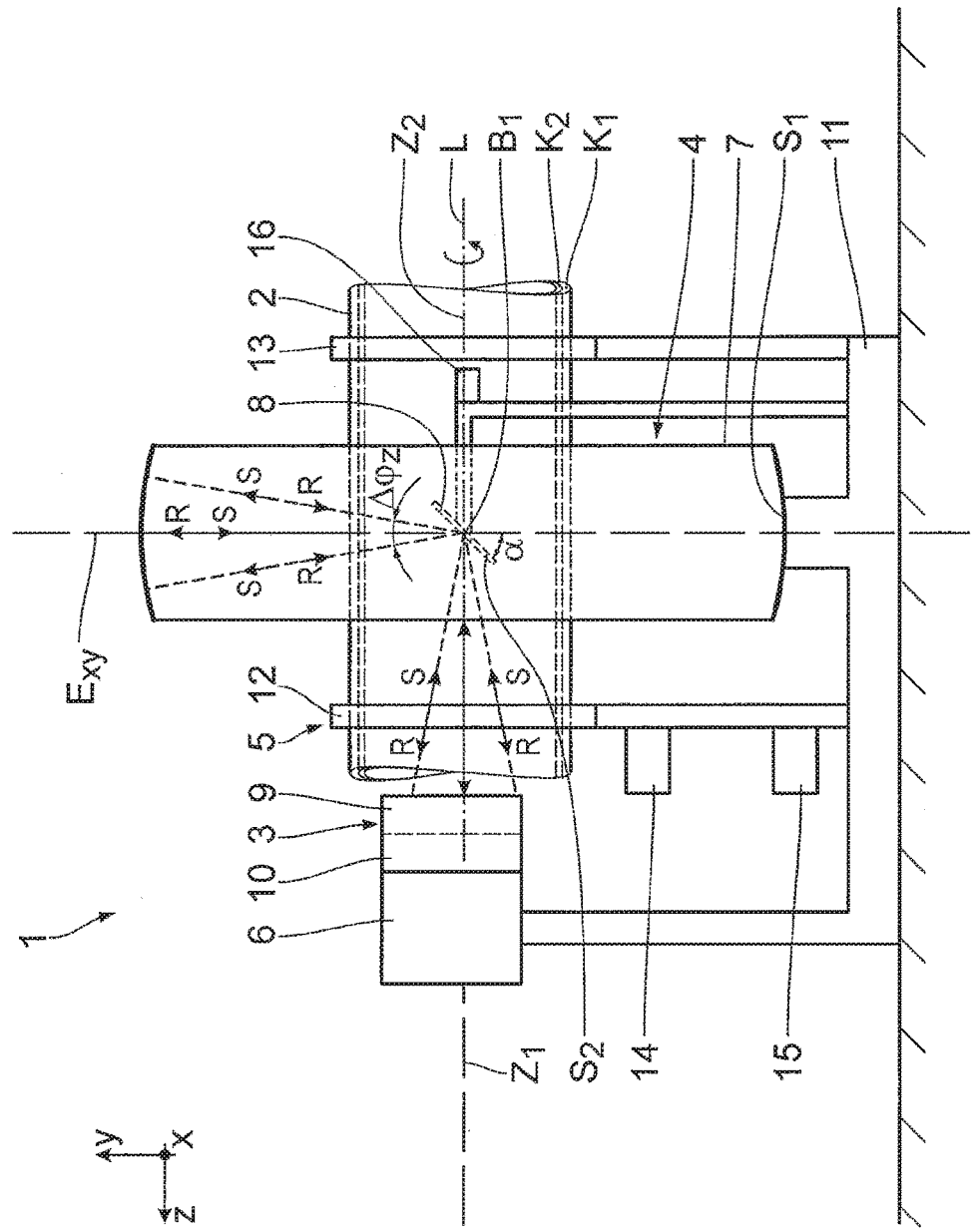

In the following a third embodiment example of the invention is described by way of FIG. 5. In contrast to the afore-mentioned embodiment examples the first mirror 7 is spherically curved along the direction z. Thus, the first mirror 7 is an equipotential ellipsoid forming upon rotation about an axis y. Thus, the radiation S is focused in the plane x-y $E_{xy}$ and along the direction z into the second focal point $B_2$. This is advantageous, in particular, when the radius r of the test object 2 is substantially smaller than the lengths a or b respectively. As regards the construction otherwise and the operation otherwise reference is made to the above embodiment examples.

Figure 6:
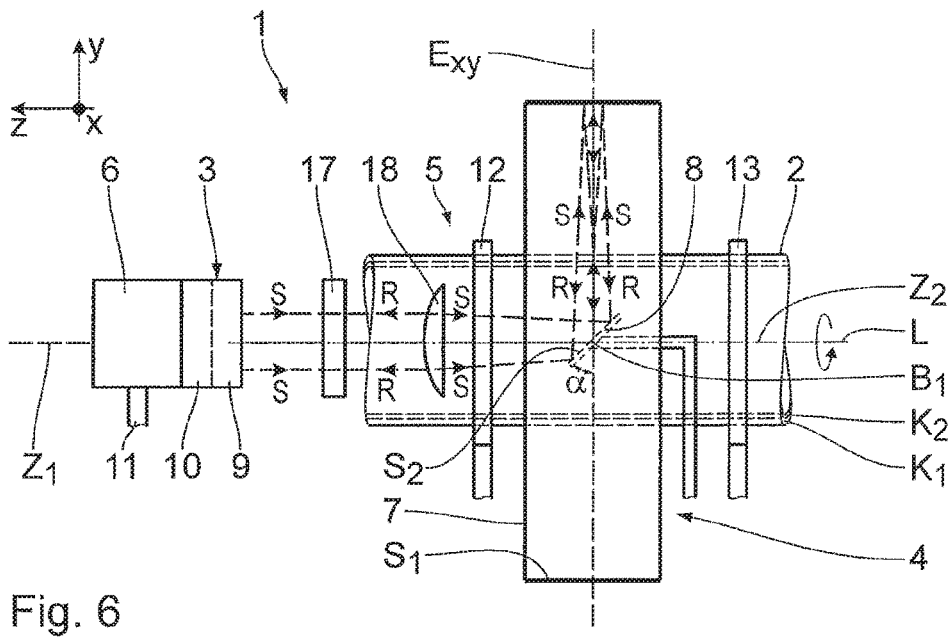
Figure 7:
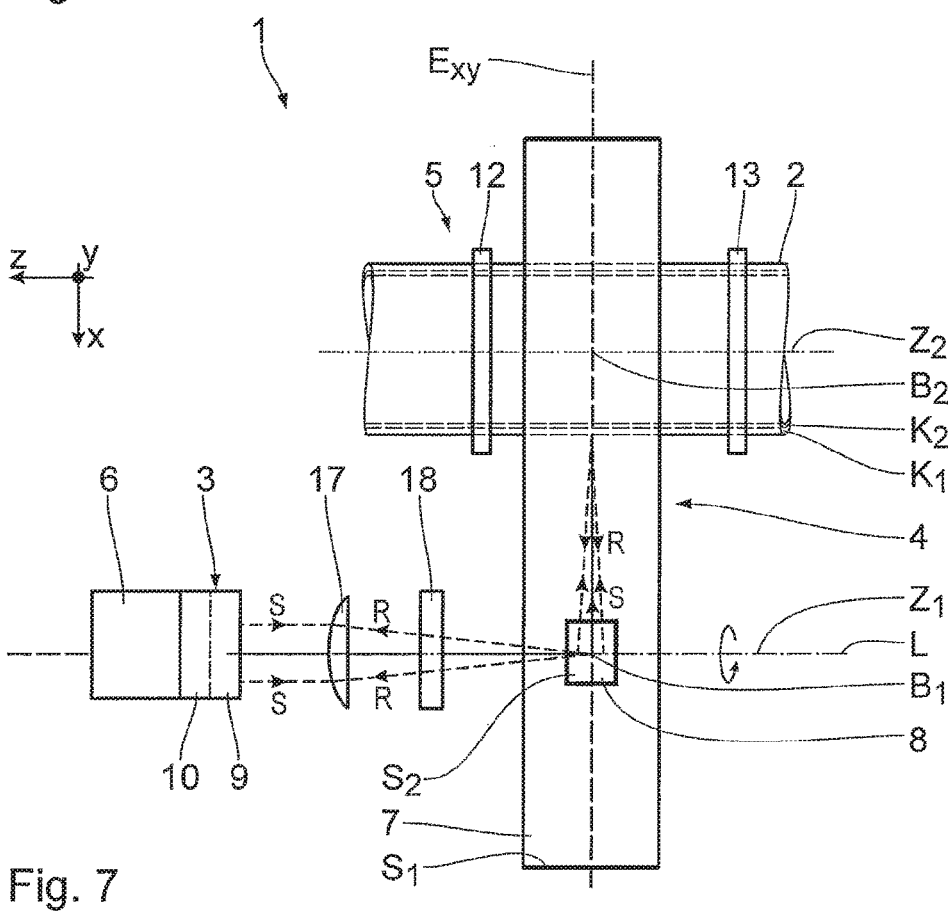

In the following a fourth embodiment example of the invention is described by way of FIGS. 6 and 7. In contrast to the afore-mentioned embodiment examples the first mirror 7 is designed to be planar in the direction z. For focusing the radiation S two focusing elements 17, 18 are disposed in the beam path between the transmitter-receiver unit 3 and the second mirror 8. The focusing elements 17, 18 rotate, together with the second mirror 8, about the first z axis $Z_1$. The incident collimated radiation S is focused by way of the first focusing element 17 in the direction x onto the first focal point $B_1$. To that end the first focusing element 17 is designed as a cylindrical lens. The second focusing element 18 focuses the radiation in the direction y whereby, after being reflected on the second mirror 8, the radiation S is focused in the direction z. This is illustrated in FIG. 6. The second focusing element 18 is also designed as a cylindrical lens, the cylinder of which is aligned in the direction x and runs perpendicular to the cylinder of the lens 17 which is aligned in the direction y. The spacing of the lens 18 up to the surface of the test object 2 corresponds to the der focal length of the lens 18. Thus, the radiation S only diverges in the plane x-y $E_{xy}$. Focusing of the radiation S in the direction z onto test objects of differing radii r happens by changing the position of the second lens 18 along the z axis $Z_1$. The means that the focusing in the direction z can be adjusted to test objects of differing radii r by way of changing the position of the second lens 18 along the z axis $Z_1$. Alternatively, the second mirror 8 and the second focusing element 18 may be designed in an integrated manner so that the second mirror 8 itself causes focusing in the direction z by virtue of a curvature. As regards the construction otherwise and the operation otherwise reference is made to the above embodiment examples.

Figure 8:
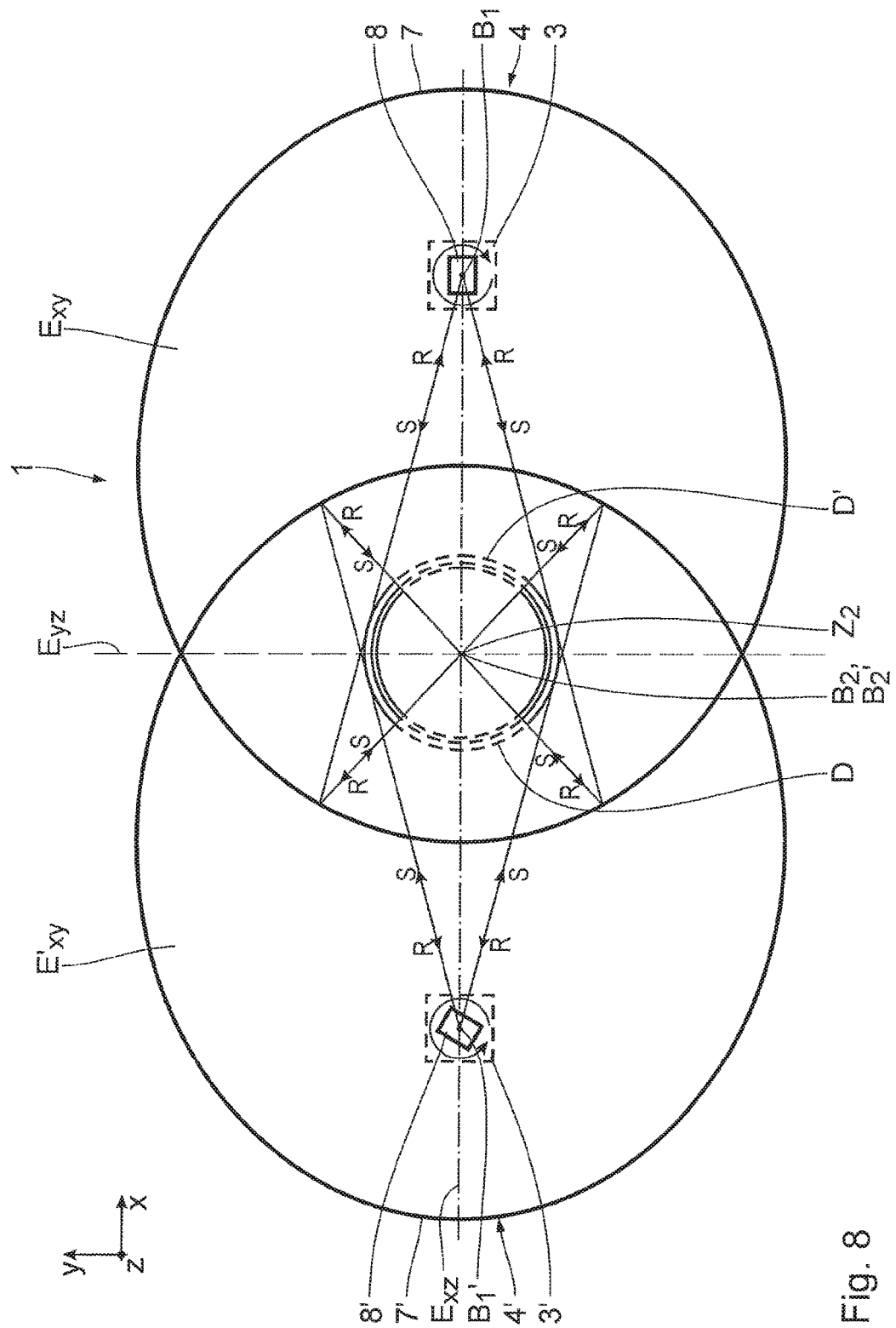

In the following a fifth embodiment example of the invention is described by way of FIG. 8. In contrast to the afore-mentioned embodiment examples the measuring device 1 comprises exactly two mirror arrays 4 and two associated transmitter-receiver units 3. In the following, for purposes of differentiation the second mirror array 4 as well as the die associated components are designed by an '. The mirror arrays 4 and 4' are designed identical, however, spaced apart from each other along the direction z and rotated in relation to each other such that the second focal points $B_2$ and $B_2$' lie spaced apart from each on the second axis z $Z_2$ and the first focal points $B_1$ and $B_1$' in a plane x-y $E_{xz}$ running through the second focal points $B_2$ and $B_2$'. Thus, the focal points $B_1$ and $B_1$' have a maximum distance from a plane y-z $E_{yz}$ running through the second focal points $B_2$ and $B_2$'. The second mirrors 8, 8' are rotatable about their associated first z axes $Z_1$ and $Z_1$' running through the respective first focal point $B_1$, $B_1$'. The test object 2 is measured inline within the manufacturing process and thus cannot be rotated about its own central longitudinal axis L, i.e. the second z axis $Z_2$ or $Z_2$' respectively. As explained already in the context of the second embodiment example, the test object 2, when measured by the respective mirror array 4, 4' and the associated transmitter-receiver unit 3, 3', exhibits a shaded area D, D'. By virtue of the positioning of the mirror arrays 4, 4', however, the mirror array 4' can measure the shaded area D of the mirror array 4 and, correspondingly, the mirror array 4 the shaded are D' of the mirror array 4'. Thus, the test object 2 can be measured entirely, although it is not pivotable or rotatable. Owing to the manufacturing process, the test object 2 exhibits an extrusion direction running in the direction z so that the test object 2 can also be or will be respectively measured along its length. There is no need for the test object holder 5 to either actively pivot or to linearly displace the test object 2 and, therefore, the test object holder may be simplified in construction such that merely a guide for the test object 2 is guaranteed.

Thus, one area of application of the measuring device 1 is the inline full examination of the wall thickness $d_W$ and the layer thicknesses $d_1$ and $d_2$ of the test object 2 being a plastic tube in the extrusion process. Measuring the test object 2 happens in accordance with the above embodiment examples contact-less and without any coupling medium. Owing to the fact that merely two transmitter-receiver units 3, 3' are required for the full or fully circumferential measuring of the test object 2, the construction remains comparatively simple thereby guaranteeing an acceptable cost-value ratio of the measuring device 1. Of course, it is possible to provide more than two mirror arrays 4 and corresponding transmitter-receiver units 3 for the measuring device 1 if they should be required. Moreover, the transmitter-receiver units 3, 3' are mounted in a fixed position relative to the associated first mirrors 7, 7' also allowing for a simple construction.

As regards the construction otherwise and the operation otherwise reference is made to the above embodiment examples.

The features of the described embodiment examples may be combined with each other at well. In particular, the focusing or collimation of the radiation S in the direction z may happen as desired and combined at will with other features of the measuring device 1. In addition, the mirror surface $S_1$ of the respective first mirror 7 or 7' in the direction z may be optimized in such a manner that for a pre-defined radius area of the test object 2 a measuring are or measuring point respectively with an acceptable focus dimension is attained. To that end the mirror surface $S_1$ may be designed as a free-form surface in the direction z.

The preferred area of application of the measuring device 1 according to the invention is the full examination or inline full examination respectively of wall and/or layer thicknesses of plastic tubes, in particular, in the manufacturing or extrusion process respectively.

Figure 9:
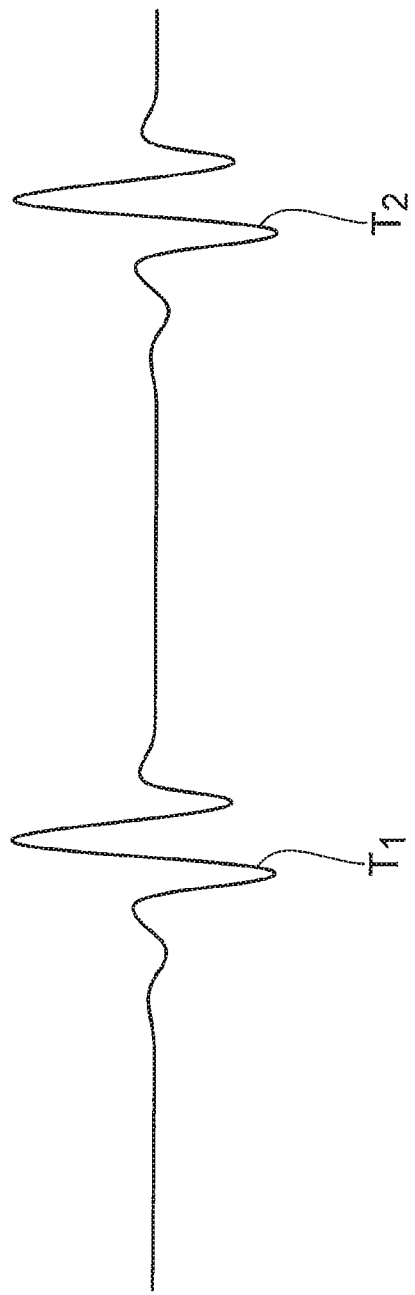

The emitted radiation is provided in particular, in the form of pulsed THz radiation, of CW THz radiation (CW: continuous wave) and/or of FMCW THz radiation (FMCW: frequency modulated continuous wave). A temporal sequence of a pulsed THz radiation is shown in FIG. 9. The successive THz pulses $T_1$ and $T_2$ as well as corresponding further THz pulses each exhibit a frequency spectrum within the afore-mentioned THz range. By way of the der THz radiation the measurements happen contact-free and without coupling medium.

Moreover, further evaluations or measurements can be carried out by way of measuring device 1 according to the invention. For example, the position of the central longitudinal axis L of the test object 2 relative to the second focal point $B_2$ may be determined. Owing to the elliptical curvature of the first mirror 7 or 7' respectively the distance of a beam path migrating from one focal point, by way of reflection on the mirror surface $S_1$ to the other focal point is always constant. Correspondingly, in the case of a test object 2 disposed concentrically to the second focal point $B_2$ al beam paths exhibit the exact same distance. Thus, the transit time of the reflected radiation R or THz pulse respectively does not change, and the detected temporal position stay constant when scanning the test object 2. In the event that the central longitudinal axis L and the second focal point $B_2$ do not coincide, the temporal position of the THz pulses changes upon scanning the test object 2. The THz pulses that incline along the lines defined by the central longitudinal axis L and the second focal point $B_2$ will exhibit the maximum pulse shift. Therefore, the direction of the shift as well as the dimension of the shift results from the maximum transit time difference and may be determined on. The position of the central longitudinal axis L relative to the second focal point $B_2$ may thereby be determined. Such information may be used, for example, for the automatic adjustment of the test object 2 upon starting up the extrusion process or for a later adjustment of the measuring device 1 which may become necessary. A reference measurement is required.

Moreover, the transit time of the THz pulses can be utilized to determine the diameter or radius r of the test object 2 as well as possible deviations from the circular shape such as eccentricity or ovality. The diameter of the test object 2 follows, with know parameters of the elliptical mirror 7 or 7' respectively, directly from the transit time of the respective THz pulse. Form parameters, such as eccentricity or ovality, may be calculated from the deviations of the transit time of individual THz pulses.

The measuring device 1 may also be operated by way of electromagnetic waves or electromagnetic radiation respectively in other Frequency bands that the afore-mentioned THz frequency band or by way of other types of waves, for example, by way of ultrasound waves. For example, a test object 2 can be measured by way of visible or infrared radiation. Prerequisite for the applicability of the method or the operability of the measuring device 1 is the waves or particles respectively used disperse radially and that the material of the mirrors and the test object 2 reflects the waves or particles respectively.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A terahertz measuring device for measuring test objects, comprising:
    a) at least one transmitter-receiver unit including:
        i) a transmitter for emitting Terahertz radiation in the Terahertz frequency band between 0.01 THz and 50 THz;
        ii) an associated receiver for detecting a radiation reflected on the test object in the Terahertz frequency band between 0.01 THz and 50 THz;
    b) at least one mirror array including
        i) a first mirror, which forms in an x-y-plane a first focal point and a second focal point, and which is, at least partially, curved elliptically for deflecting the radiation between the first and second focal points; and
        ii) a second mirror, disposed in the area of the first focal point, for deflecting the radiation between a direction z running perpendicular to the x-y plane and the x-y plane; and
    c) a test object holder for arranging the test object in the area of the second focal point; and
    d) a control unit for determining a wall thickness or layer thickness of the test object, the control unit being connected to the transmitter and the receiver for controlling the transmitter and evaluating the reflected radiation detected by the receiver; and
    e) at least two mirror arrays are disposed displaced relative to each other in the direction z and their respective first focal points are spaced apart perpendicular to the direction z, and the at least two mirror arrays are constructed identically.

2. The terahertz measuring device according to claim 1, wherein:
    a) the at least one transmitter-receiver unit is disposed along an axis z running parallel to direction z through the first focal point.

3. The terahertz measuring device according to claim 1, wherein:
    a) the respective second focal points lie on a line which runs parallel to the direction z.

4. The terahertz measuring device according to claim 1, wherein:
    a) the respective first focal points of the exactly two mirror arrays lie on different sides of a y-z plane running through the second focal points.

5. The terahertz measuring device according to claim 1, wherein:
    a) each mirror array is associated with a transmitter-receiver unit.

6. The terahertz measuring device according to claim 1, wherein:
    a) the second mirror is pivotable about an axis z running parallel to the direction z through the first focal point.

7. The terahertz measuring device according to claim 1, wherein:
    a) the test object holder configured in such a way that the test object is pivotable about an axis of rotation running through the second focal point.

8. The terahertz measuring device according to claim 1, wherein:
    a) the respective first mirror is curved along an ellipse, the ellipse being defined by a first semiaxis of a length a and a second semiaxis of a length b shorter in comparison with the first semiaxis, whereby at least one of the following is true for a relationship of the lengths: $a/b \leq 1.3$, $a/b \leq 1.2$, and $a/b \leq 1.1$.

9. The terahertz measuring device according to claim 1, wherein:
    a) the respective first mirror exhibits a concave curvature in the direction z, the curvature being selected, in particular, from the group of parabolic, elliptical and spherical.

10. The terahertz measuring device according to claim 1, wherein:
    a) the respective first mirror is planar in the direction z and at least one focusing element is provided for focusing the terahertz radiation in the direction z.

11. A method for measuring test objects, and for determining a wall thickness or layer thickness of the test objects, comprising the following steps:
    a) providing the terahertz measuring device according to claim 1;
    b) placing the test object such that its central longitudinal axis runs through the second focal point;
    c) emitting terahertz radiation, in a band between 0.01 THz and 50 THz, by use of the transmitter;

d) deflecting the emitted terahertz radiation by use of the second mirror and the first mirror in the direction of the second focal point;
e) reflecting the terahertz radiation on the test object;
f) deflecting the reflected terahertz radiation by use of the first mirror and the second mirror in the direction of the receiver;
g) detecting the reflected terahertz radiation by use of the receiver;
h) evaluating the detected radiation; and
i) determining the wall thickness or layer thickness from the detected reflected terahertz radiation.

12. The method according to claim 11, wherein:
a) the test object and the second mirror are pivoted relative to each other, and the second mirror being pivoted about the axis z running parallel to the direction z through the first focal point.

13. The method according to claim 11, wherein:
a) the test object at least partially includes a layer of material in the shape of a hollow cylinder.

14. The method according to claim 11, wherein:
a) the at least one transmitter-receiver unit is configured in such a way that electromagnetic terahertz radiation at a frequency in the band between at least one of 0.01 THz and 50 THz, 0.05 THz to 20 THz, and 0.1 THz to 10 THz, is emitted.

15. The method according to claim 11, wherein:
a) the measuring and determining of a wall thickness is carried out with respect to at least one layer of material across the entire circumference of the test object, the at least one layer of material is in the shape of a hollow cylinder.

16. The method according to claim 11, wherein:
a) the wall thickness or the layer thickness of the test objects is made of plastic.

17. The terahertz measuring device according to claim 1, wherein:
a) the test object holder for arranging the test object is configured for arranging a test object made of plastic.

18. The terahertz measuring device according to claim 17, wherein:
a) the test object holder for arranging the test object made of plastic is configured for arranging a test object including plastic pipes having a circular cross section.

* * * * *